INVENTORS.
RUFFNER CAMPBELL
WILLIAM L. HAYES, JR.
BY
ATTORNEY

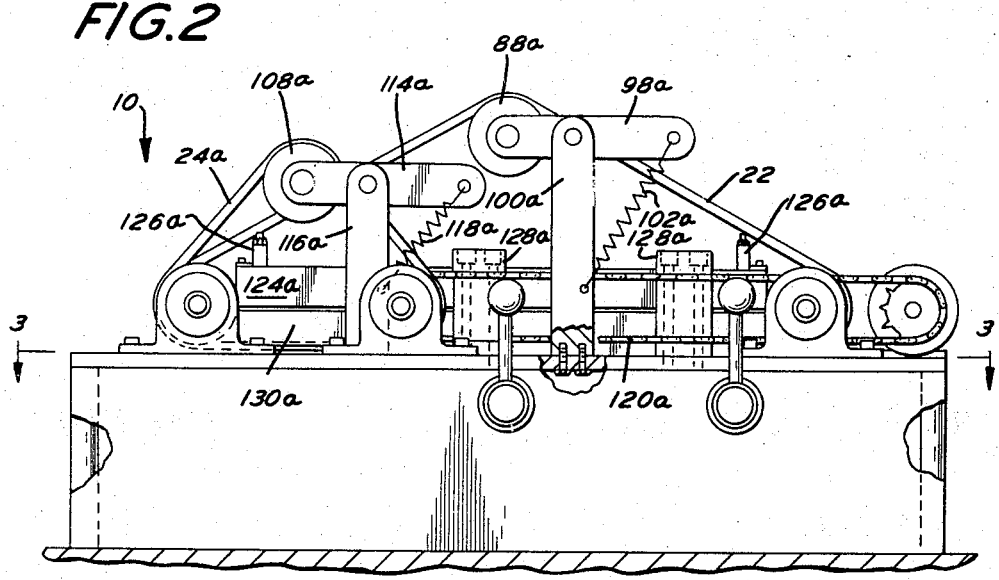
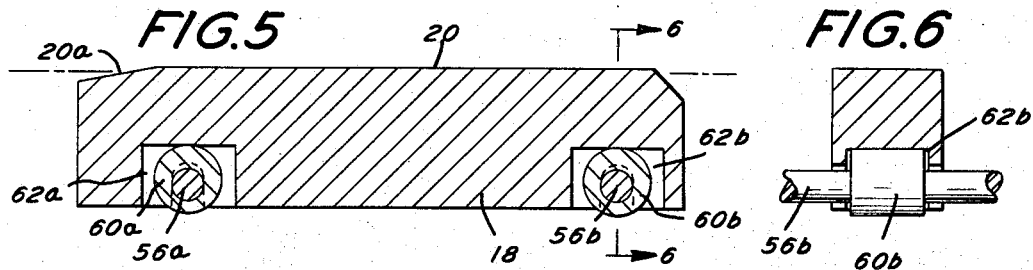
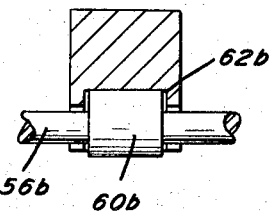
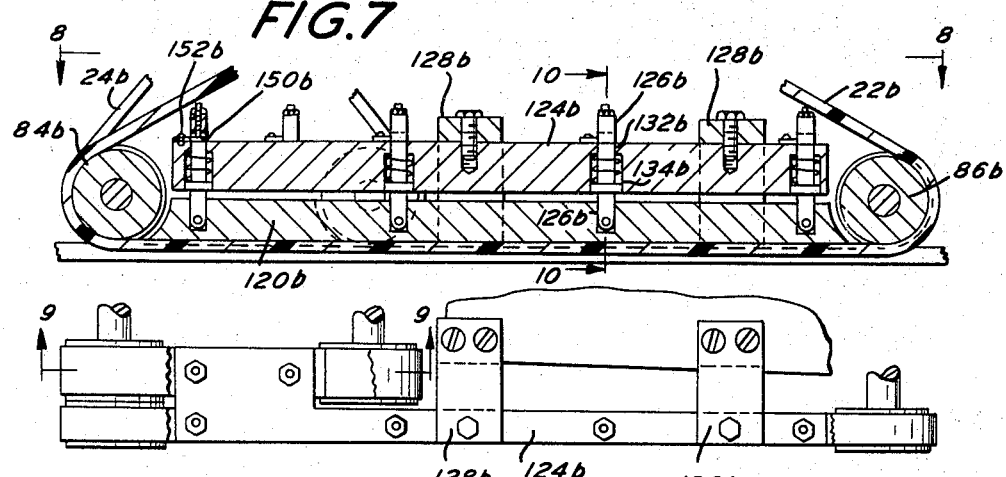

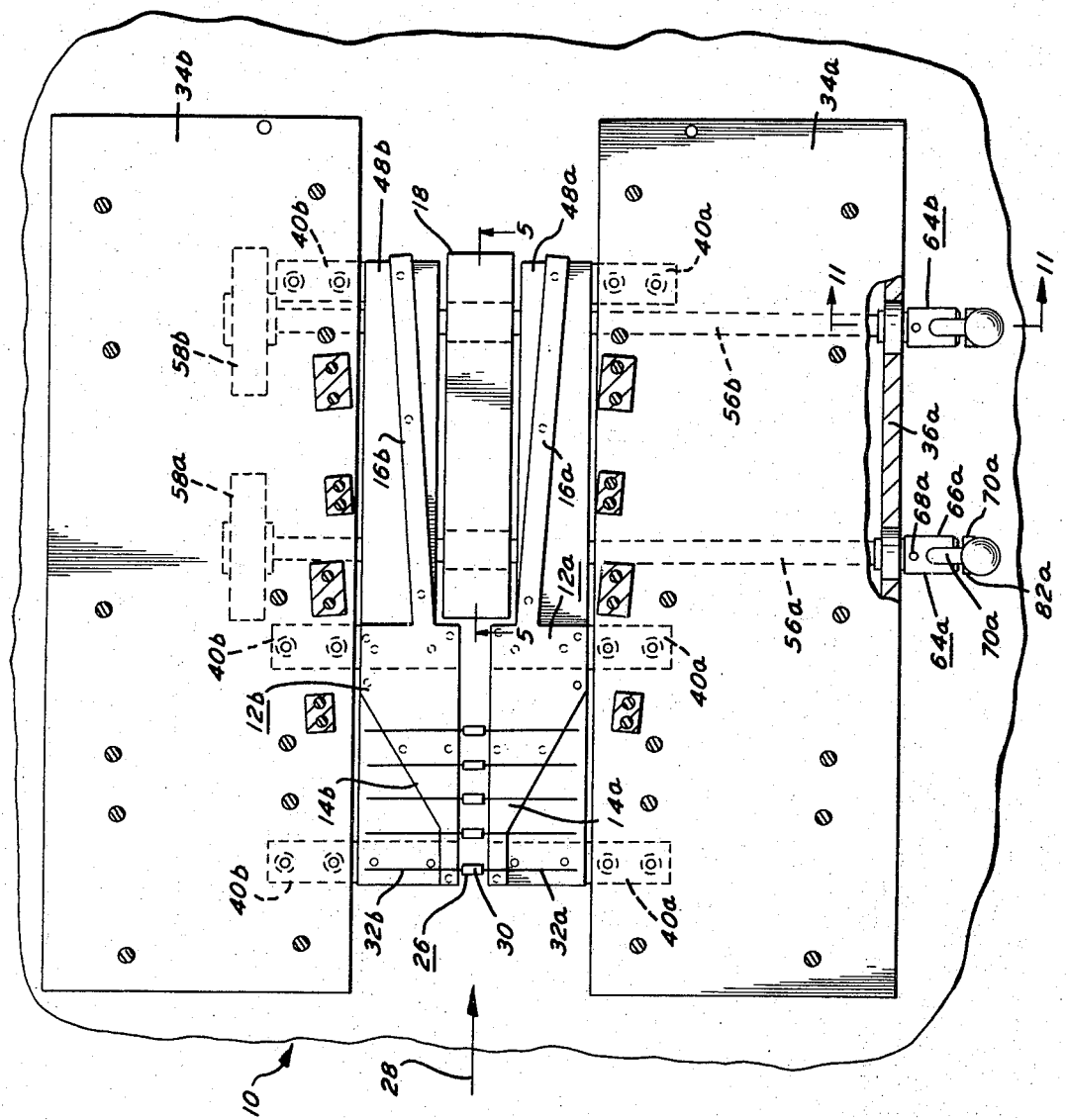

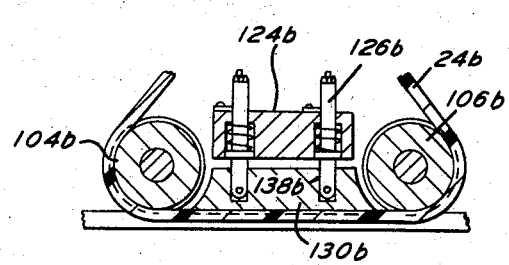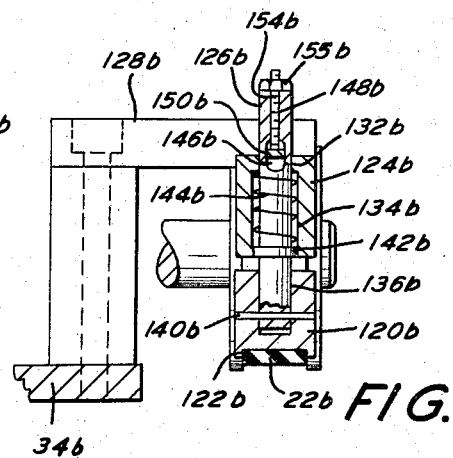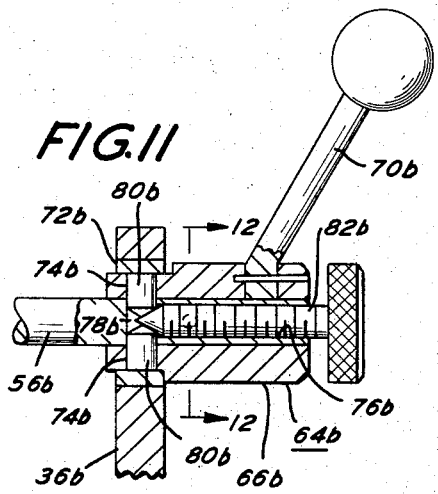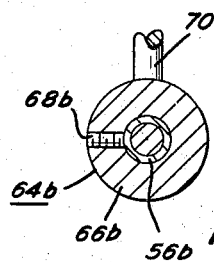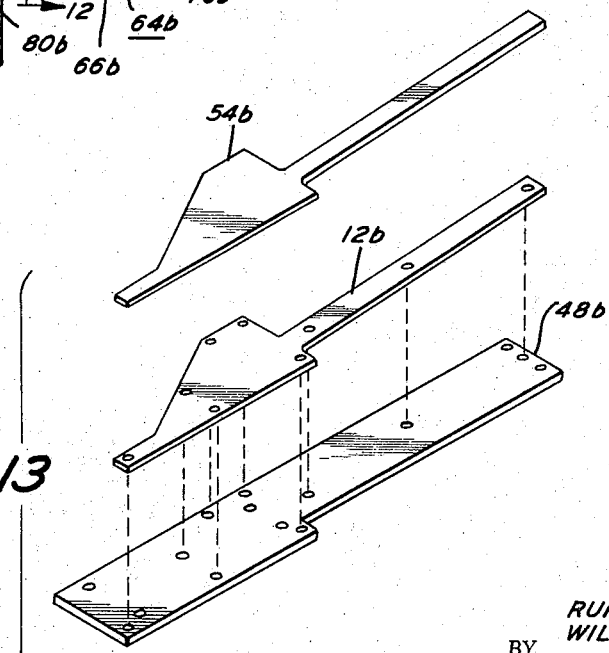

United States Patent Office 3,348,586
Patented Oct. 24, 1967

3,348,586
LEAD STRAIGHTENING MACHINE
Ruffner Campbell and William L. Hayes, Jr., Boone, N.C., assignors to International Resistance Company, Philadelphia, Pa.
Filed Oct. 22, 1965, Ser. No. 501,202
8 Claims. (Cl. 140—147)

The present invention relates to a lead straightening machine and, more particularly, to a machine for straightening the terminal lead wires of an electrical component.

Many electrical components, such as resistors, capacitors, diodes, etc., comprise a central cylindrical body portion and a pair of terminal lead wires extending from opposite ends of the body portion. The lead wires are usually made of an electrically conductive metal which is relatively soft and ductile, such as copper. Thus, during the manufacture of the electrical component, the lead wires become bent and distorted.

In the use of such electrical components in assembling electrical circuits for many types of electronic equipment, the terminal lead wires of the components are often cut and mechanically formed to permit automatic insertion of the components in printed circuit boards. For this purpose, the user desires that the terminal lead wires be straight, i.e., free from bends and distortions. Also, it is desirable that the terminal lead wires extend along the longitudinal axis of the body of the component.

It is an object of the present invention to provide a novel lead straightening machine.

It is another object of the present invention to provide a novel machine for removing bends and distortions from the terminal lead wires of an electrical component.

It is a further object of the present invention to provide a machine which removes the bends and distortions from the terminal lead wires of an electrical component and which places the lead wires along the longitudinal axis of the body of the component.

It is a still further object of the present invention to provide a machine for straightening the terminal lead wires of an electrical component which can be adjusted for various diameters and materials of the lead wires and for various diameters of the body of the electrical component.

Other objects will appear hereinafter.

For the purpose of illustrating the invention, there is shown in the drawings a form which is presently preferred; it being understood, however, that this invention is not limited to the precise arrangements and instrumentalities shown.

FIGURE 2 is a side plan view of the machine of the present invention, taken along line 2—2 of FIGURE 1.

FIGURE 3 is a sectional view of the machine of the present invention, taken along line 3—3 of FIGURE 2.

FIGURE 5 is a sectional view of the component body-supporting platform taken along line 5—5 of FIGURE 3.

FIGURE 6 is a sectional view taken along line 6—6 of FIGURE 5.

FIGURE 7 is a sectional view of the long belt pressure pad taken along line 7—7 of FIGURE 1.

FIGURE 8 is a top plan view taken along line 8—8 of FIGURE 7.

FIGURE 9 is a sectional view of the short belt pressure pad, taken along line 9—9 of FIGURE 8.

FIGURE 10 is a sectional view taken along line 10—10 of FIGURE 7.

FIGURE 11 is a sectional view of the height adjustment knob for the component body-supporting platform, taken along line 11—11 of FIGURE 3.

FIGURE 12 is a sectional view taken along line 12—12 of FIGURE 11.

FIGURE 13 is an exploded perspective view of the lead straightening machine plate assembly of the machine of the present invention.

Figure 1:
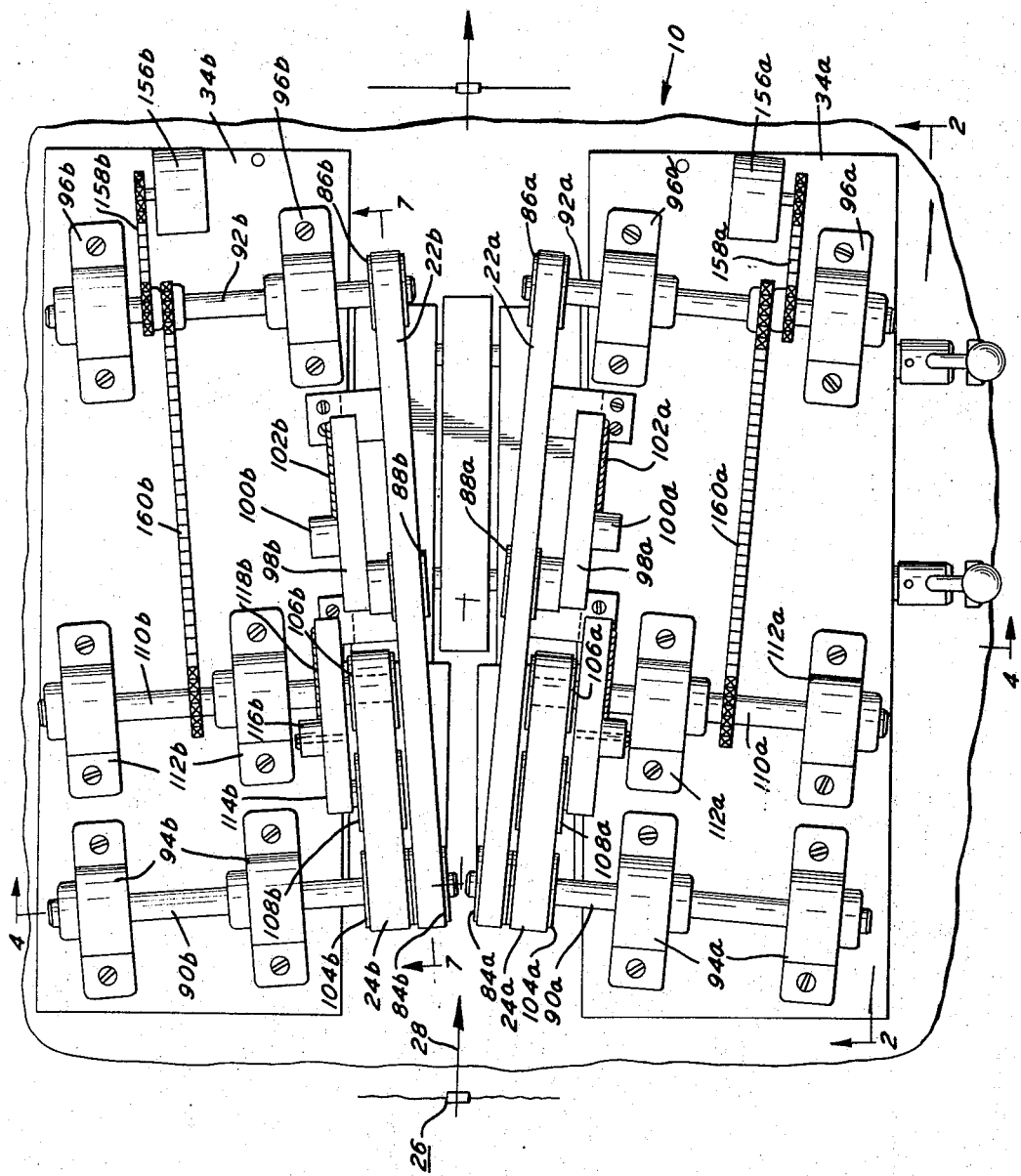
FIGURE 1 is a top plan view of the machine of the present invention.

Referring to the drawings, the lead straightening machine of the present invention is generally designated as 10. In general, the lead straightening machine 10 comprises a pair of horizontally extending, flat lead straightening plates 12a and 12b (see FIGURE 3), mounted in spaced, parallel relation and lying in the same plane. The lead straightening plates 12a and 12b have straightening portions 14a and 14b respectively, and aligning portions 16a and 16b extending from the straightening portions 14a and 14b respectively. The width of the straightening portions 14a and 14b tapers outwardly with the entrance end (the left-hand end as viewed in FIGURE 3) being the narrowest portion. The aligning portions 16a and 16b are uniform width and taper away from each other from the widest ends of the straightening portions 14a and 14b to the exit end of the lead straightening plates 12a and 12b.

A platform 18 is mounted between the aligning portions 16a and 16b of the plates 12a and 12b and extends along the line that bisects the angle between the aligning portions. As shown in FIGURE 5, the top surface 20 of the platform 18 is flat except for an upwardly inclined portion 20a at the forward end of the platform. The platform is positioned so that its top surface 20 is above the level of the top surface of the straightening plates 12a and 12b.

As shown in FIGURE 1, a pair of endless belts 22a and 22b are mounted over and extend along the full length of the lead straightening plates 12a and 12b respectively. The endless belts 22a and 22b extend over and follow the paths of the aligning portions 16a and 16b of the plates 12a and 12b. A second pair of endless belts 24a and 24b are mounted over the lead straightening plates 12a and 12b, but extend only over the straightening portions 14a and 14b of the plates. The short endless belts 24a and 24b are positioned along the outer sides of the longer endless belts 22a and 22b, and each of the shorter belts is parallel to its adjacent longer belt. All the belts 22a, 22b, 24a and 24b are driven in the same direction and at the same speed. The belts are driven so that they pass across the lead straightening plates 12a and 12b from left to right as viewed in FIGURES 1 and 3.

In the operation of the lead straightening machine 10 of the present invention, the electrical components 26 are inserted in the direction of the arrow 28 (see FIGURES 1 and 3) between the lead straightening plates 12a and 12b and the endless belts 22a, 22b, 24a and 24b. As shown in FIGURE 3, the cylindrical body portions 30 of the electrical components 26 extend between the adjacent but spaced edges of the straightening portions 14a and 14b of the lead straightening plates 12a and 12b. The terminal lead wires 32a and 32b, which extend axially from the ends of the body portions 30, extend over and contact the upper surface of the straightening portions 14a and 14b respectively of the straightening plates. The endless belts 22a, 22b, 24a and 24b are positioned so that the terminal lead wires 32a and 32b are engaged by the belts. Thus, the movement of the belts over the straightening plates causes the lead wires 32a and 32b to roll along the straightening portions 14a and 14b in the direction of the arrow 28. As the lead wires 32a and 32b are rolled along the tapered straightening portions 14a and 14b of the straightening plates 12a and 12b, the bends and distortions in the lead wires are rolled out starting at the portion of the lead wires adjacent the body portion 30 and moving outwardly toward the ends of the lead wires.

When the electrical components 26 reach the widest end of the straightening portions 14a and 14b, the lead wires 32a and 33b are completely free of bends and distortions.

At the end of the straightening portions 14a and 14b of the straightening plates 12a and 12b, the engagement of the endless belts 22a and 22b with the lead wires 32a and 32b continues the forward rolling of the electrical components 26. The body portion 30 of the components is rolled up the inclined portion 20a of the platform top surface 20 and along the platform 18. Since the top surface 20 of the platform 18 is above the top surfaces of the straightening plates 12a and 12b, the endless belts 22a and 22b bend the lead wires 32a and 32b downwardly against the aligning portions 16a and 16b of the straightening plates. At the point that the electrical component 26 reaches the top surface 20 of the platform 18, the endless belts 22a and 22b engage the lead wires 32a and 32b at positions closest to the body 30. This bends the lead wires 32a and 32b downwardly at the maximum deflection from the longitudinal axis of the body 30. Since these aligning portions 16a and 16b of the straightening plates 12a and 12b and the endless belts 22a and 22b angle away from the platform 18, the engagement between the belts 22a and 22b and the lead wires 32a and 32b moves outwardly along the lead wires as the electrical component 18. Thus, the lead wires are rolled by the endless belts long their full lengths with an ever decreasing angle of deflection from the longitudinal axis of the body 30. When the electrical component 26 reaches the forward end of the platform 18 and emerges from the lead straightening machine 10, the lead wires 32a and 32b are not only straight, i.e., free from bends and distortions, but also extend along the longitudinal axis of the body 30 of the component.

Figure 4:
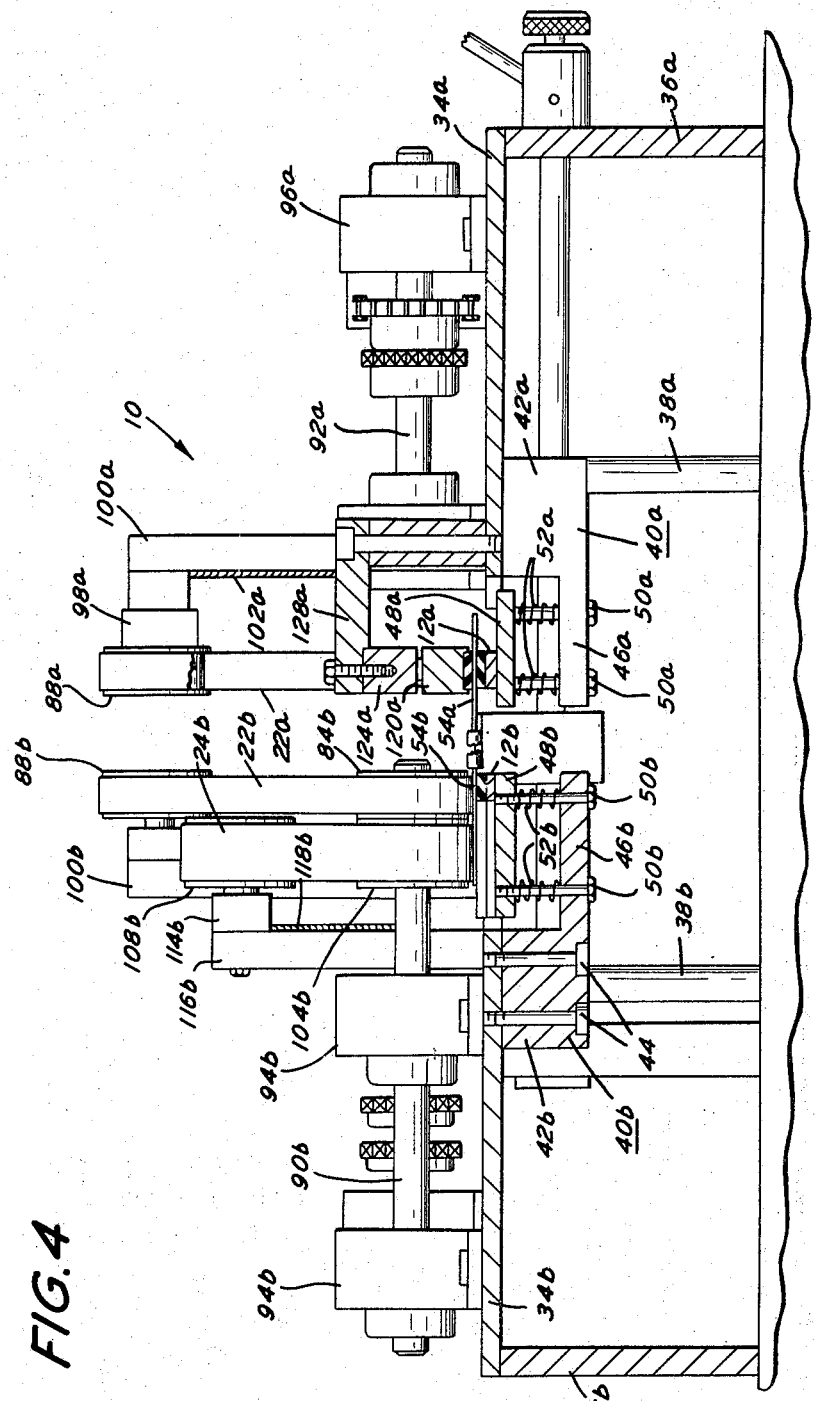
FIGURE 4 is a sectional view of the machine of the present invention, taken along line 4—4 of FIGURE 1.

Lead straightening machine 10 in greater detail comprises a pair of rectangular base plates 34a and 34b mounted in spaced, parallel relation in the same plane (see FIGURES 1, 3 and 4). Vertical supporting plates 36a and 36b extend along and support the outer edges of the base plates 34a and 34b respectively, and supporting posts 38a and 38b support the inner edges of the base plates (see FIGURE 4). Three pairs of mounting brackets 40a and 40b are secured to the bottom surface of the base plates 34a and 34b, respectively, at spaced points along the inner edges of the base plates (see FIGURES 3 and 4). As shown in FIGURE 4, the mounting brackets 40a and 40b each comprises a base portion 42a and 42b seated against the bottom surface of its respective base plates 34a and 34b and secured thereto by bolts 44. Bracket arms 46a and 46b extend horizontally from the base portions 42a and 42b respectively and extend toward each other across the space between the base plates 34a and 34b. The bracket arms 46a and 46b are parallel to but spaced below the base plates 34a and 34b.

A pair of parallel pressure plates 48a and 48b extend horizontally between the inner edges of the base plates 34a and 34b and are mounted on the bracket arms 46a and 46b respectively (see FIGURE 4). Separate pairs of spaced bolts 50a and 50b extend upwardly through end of the bracket arms 46a and 46b and are threaded into the pressure plates 48a and 48b respectively. Helical springs 52a and 52b extend around the bolts 50a and 50b between the pressure plates 48a and 48b and the bracket arms 46a and 46b. Thus, the pressure plates 48a and 48b are resiliently mounted on the bracket arms 46a and 46b by the springs 52a and 52b.

As shown in FIGURES 3 and 13, the lead straightening plates 12a and 12b are mounted on the pressure plates 48a and 48b respectively. Pads 54a and 54b of a resilient material, such as rubber, extend over and are secured to the lead straightening plates 12a and 12b. The pads 54a and 54b are of the same size and shape as the lead straightening plates 12a and 12b. The pressure plates 48a and 48b are substantially rectangular except that the forward portion over which the aligning portions 16a and 16b of the lead straightening plates 12a and 12b extend is narrower so as to accommodate the platform 18 therebetween (see FIGURES 1 and 3).

The platform 18 is mounted between the forward portions of the pressure plates 48a and 48b on a pair of spaced, parallel shafts 56a and 56b (see FIGURE 3) which extend transversely across the platform adjacent the ends of the platform. The shafts 56a and 56b extend through and are rotatably supported at one end of the supporting plate 36a, and are supported at their other ends in bearing blocks 58a and 58b mounted beneath the base plate 34b. As shown in FIGURE 5, the shafts 56a and 56b have cams 60a and 60b thereon which fit into grooves 62a and 62b respectively in the bottom of the platform 18. Thus, by rotating the shafts 56a and 56b, the cams 60a and 60b are rotated so as to vary the vertical position of the platform 18.

As shown in FIGURES 1 and 3, adjustment handles, generally designated as 64a and 64b, are provided on the ends of the shafts 56a and 56b which project beyond the supporting plate 36a. As shown in FIGURE 11, handle 64b comprises a cylindrical hub 66b surrounding the end of the shaft 56b and secured thereto by a set screw 68b. A handle arm 70b is secured to the hub 66b and extends radially outwardly therefrom. One end of the hub 66b extends through and is rotatably supported in a bearing 72b in the supporting plate 36a. A pair of diametrically aligned holes 74b extend radially through the hub 66b within the bearing 72b. Shaft 56b has a threaded passage 76b extending longitudinally therethrough from its end to a point within the bearing 72b. A hole 78b extends diametrically through the shaft 56b at the end of the passage 76b and in alignment with the holes 74b in the hub 66b. A pair of locking pins 80b are provided in the holes 74b and 78b and have conical inner ends. A locking screw 82b is threaded in the passage 76b and has a conical end which engages the conical ends of the locking pins 80b. By threading the locking screw 82b inwardly, the locking pins 80b are forced radially outwardly against the surface of the bearing 72b to lock the shaft 56b against rotation. Threading the locking screw 82b outwardly releases the locking pins 80b from the bearing 72b and permits rotation of the shaft 56b.

Handle 64a is identical to handle 64b and includes a hub 66a secured on the shaft 56a by a set screw 68a, and an arm 70a extending radially outwardly from the hub 66a. A locking screw 82a is threaded into the end of the shaft 56a and engages a pair of locking pins (not shown) to lock the shaft 56a against rotation. Thus, the height of the top surface 20 of the platform 18 above the lead straightening plates 12a and 12b can be adjusted and secured to permit accommodation of electrical components of various sizes of body positions.

Endless belt 22a is mounted on and extends around three pulleys 84a, 86a and 88a, and endless belt 22b is mounted on and extends around three pulleys, 84b, 86b and 88b. Pulleys 84a and 84b are mounted on shafts 90a and 90b respectively, and pulleys 86a and 86b are mounted on shafts 92a and 92b respectively. Shafts 90a and 90b extend across the base plates 34a and 34b at the entrance end of the machine 10, and are rotatably supported in pairs of bearing blocks 94a and 94b respectively which are mounted on the base plate. Shafts 92a and 92b extend across the base plates 34a and 34b respectively adjacent the forward end of the machine 10. Shaft 92a is rotatably supported in a pair of bearing blocks 96a mounted on base plate 34a, and shaft 92b is rotatably supported in a pair of bearing blocks 96b mounted on base plate 34b.

Pulleys 88a and 88b are tensioning pulleys and are mounted between and vertically above pulleys 84a and 86a and 84b and 86b respectively. As shown in FIGURE 2, pulley 88a is rotatably mounted on the end of an arm 98a which is pivotally mounted between its ends on an upright post 100a. Post 100a is secured to the base plate 34a. A spring 102a is connected under tension between the other end of the arm 98a and the post 100a. The spring 102a urges the pulley 88a upwardly to remove any slack from the endless belt 22a. Pulley 88b is likewise mounted on an arm 98b which is pivotally mounted on an upright post 100b. Post 100b is mounted on the base plate 34b. A spring 102b is connected under tension between the other end of the arm 98b and the post 100b to urge the pulley 88b upwardly and remove any slack from the endless belt 22b.

Endless belt 24a is mounted on and extends around pulleys 104a, 106a and 108a, and endless belt 24b is mounted on and extends around pulleys 104b, 106b and 108b. Pulleys 104a and 104b are mounted on the shafts 90a and 90b juxtaposed the pulleys 84a and 84b respectively. Pulleys 106a and 106b are mounted on shafts 110a and 110b respectively. Shafts 110a and 110b extend across the base plates 34a and 34b respectively and are mounted in sets of bearing blocks 112a and 112b respectively. Pulleys 108a and 108b are tensioning pulleys and are mounted between and above the pulleys 104a and 106a and 104b and 106b respectively. As shown in FIGURE 2, pulley 108a is rotatably mounted on the end of an arm 114a which is pivotally mounted between its ends on an upright post 116a. Post 116a is mounted on the base plate 34a. A spring 118a is connected under tension between the other end of the arm 114a and the post 116a. Spring 118a urges the pulley 108a upwardly to remove any slack from the endless belt 24a. Pulley 108b is likewise rotatably mounted on the end of an arm 114b which is pivotally mounted between its ends on an upright post 116b. The post 116b is mounted on base plate 34b. A spring 118b is connected under tension between the other end of the arm 114b and the post 116b to urge the pulley 108b upwardly and remove any slack from the endless belt 24b.

As shown in FIGURE 7, a pressure pad 120b extends over the horizontal portion of the endless belt 22b between the pulleys 84b and 86b. Pressure pad 120b has a groove 122b extending longitudinally along its bottom surface through which the belt 22b moves (see FIGURE 10). Pressure pad 120b is supported from a mounting bar 124b by four pins 126b. The mounting bar 124b is supported by brackets 128b which are mounted on the base plate 34b. As shown in FIGURE 9, a pressure pad 130b extends over the horizontal portion of the endless belt 24b between the pulleys 104b and 106b. Pressure pad 130b also has a groove (not shown) extending longitudinally along its bottom surface through which the endless belt 24b moves. The pressure pad 130b is supported from the mounting bar 124b by a pair of the pins 126b.

Each of the pins 126b extends vertically through a separate hole 132b in the mounting bar 124b which opens into an enlarged recess 134b in the bottom surface of the bar. The bottom end of the pin 126b fits in a hole 136b or 138b in the top surface of the pressure pads 120b or 130b respectively and is secured therein by a pin 140b. Pin 126b has an annular flange 142b extending radially outwardly therefrom at the open end of the recess 134b in the mounting rod 124b. A helical spring 144b surrounds the pin 126b within the recess 134b, and is compressed between the closed end of the recess and the flange 142b. As shown in FIGURE 10, pin 126b has a hole 146b extending diametrically therethrough at the point where the pin projects from the top of the mounting bar 124b. The hole 146b is elongated axially of the pin 126b. A threaded hole 148b extends longitudinally through the pin 126b from the top end of the pin to the hole 146b. A flat, rigid metal strip 150b is secured to the top surface of the mounting bar 124b next to the pin 126b by a screw 152b (see FIGURE 7). The strip 150a extends through the transverse hole 132b in the pin 126b. A screw 154b is threaded in the longitudinal hole 148b in the pin 126b and engages the strip 150. A lock nut 155b is threaded on the top end of the screw 154b and is seated on the top end of the pin 126b. Rotation of the screws 154b toward and away from the strips 150b causes vertical movement of the pressure pads 120b and 130b, so as to adjust the spacing between the endless belts 22b and 24b and the lead straightening plate 12b.

A pressure pad 120a, identical to pressure pad 120b, extends over and along the endless belt 22a between the pulleys 84a and 84b, and a pressure pad 130a, identical to pressure pad 130b, extends over and along the endless belt 24a between the pulleys 104a and 106a. The pressure pads 120a and 130a are supported from a mounting bar 124a by pins 126a. The mounting bar 124a is supported by brackets 128a which are mounted on the base plate 34a. The pressure pads 120a and 130a serve to control the spacing between the lead straightening plate 12a and the endless belts 22a and 24a.

Electric motors 156a and 156b are mounted on the base plates 34a and 34b respectively adjacent the shafts 92a and 92b respectively. The motors 156a and 156b are drivingly connected to the shafts 92a and 92b by drive chains 158a and 158b respectively. Shafts 92a and 92b are drivingly connected to shafts 110a and 110b by drive chains 160a and 160b respectively. Thus, the endless belts 22a, 22b, 24a and 24b are driven in unison by the motors 156a and 156b through the drive chains 158a, 158b, 160a and 160b and the shafts 92a, 92b, 110a and 110b. Although the endless belts are shown as being driven from two separate motors, a single motor can be used to drive the shafts 92a and 92b through suitable drive connections.

Thus, as previously described, the lead straightening machine 10 of the present invention operates to both remove bends and distortions from the terminal lead wires of the electrical components, and to align the lead wires along the axis of the body portion of the components. The machine 10 can be adjusted to accommodate different sizes of the electrical components. The spacing between the endless belts and the straightening plates can be adjusted to compensate and adjust for terminal lead wires of different diameters and materials, and the position of the platform can be adjusted vertically to compensate for various diameters of the body portions of the components.

The present invention may be embodied in other specific forms without departing from the spirit or essential attributes thereof, and, accordingly, reference should be made to the appended claims, rather than to the foregoing specification as indicating the scope of the invention.

We claim:

1. A machine for straightening the terminal leads of an electrical component of the type having a cylindrical body portion and terminal lead wires extending longitudinally from the ends of the body portion comprising:
   a pair of lead straightening plates lying in the same horizontal plane and having adjacent straight edges in spaced parallel relation,
   each of said lead straightening plates having a lead straightening portion extending from the entrance end of the plate and a lead aligning portion extending from the straightening portion to the exit end of the plate,
   the width of said straightening portions tapering outwardly from a narrowest entrance end, the aligning portions being of uniform width and tapering away from each other from the widest end of the straightening portions;
   a platform mounted between and extending along the aligning portions of the lead straightening plates,
   said platform having a horizontal top surface which is vertically above the top surfaces of the lead straightening plates;
   a separate endless belt extending over the top surface of each of the lead straightening plates,
   each of said belts having a portion juxtaposed to and extending completely along the top surface of its respective lead straightening plate; and
   means for driving said endless belts so that the portions of the belts juxtaposed to the straightening plates move from the entrance ends of the straightening plate to the exit ends thereof.

2. A terminal lead straightening machine in accordance with claim 1 including a second pair of endless belts, each of said second endless belts being next to and extending parallel to a separate one of said first mentioned endless belts and having a portion juxtaposed to and extending along the top surface of a separate one of the straightening portions of the straightening plates, and means for driving said second endless belts simultaneously with said first mentioned endless belts.

3. A terminal lead straightening machine in accordance with claim 2 including means supporting said platform so as to permit variation of the height of the top surface of the platform with respect to the top surface of the straightening plates.

4. A terminal lead straightening machine in accordance with claim 3 including a pair of horizontal base plates having adjacent edges in special parallel relation, vertical support means supporting said base plates in the same horizontal plane, a separate pair of brackets secured to the bottom surface of each of said base plates and extending partially across the space between the adjacent edges of the base plates, said lead straightening plates being positioned in the space between the adjacent edges of the base plates and mounted on the brackets, and means mounted on said base plates and supporting said endless belts over the lead straightening plates.

5. A terminal lead straightening machine in accordance with claim 4 in which the means supporting each of the endless belts comprises a separate pair of spaced pulleys around which the endless belt extends, and means rotatably supporting each of said pulleys on its respective adjacent base plate.

6. A terminal lead straightening machine in accordance with claim 5 including a separate pressure pad extending over and along the portion of each of the endless belts which is juxtaposed to the top surface of said straightening plates, means mounted on said base plates and supporting said pressure pads, and means holding said pressure pads against the endless belts.

7. A terminal lead straightening machine in accordance with claim 6 in which the means supporting said pressure pads includes means for adjusting the height of the pressure pads with respect to the lead straightening plates so as to permit variation of the spacing between the endless belts and the straightening plates.

8. A terminal lead straightening machine in accordance with claim 7 in which the means supporting the platform comprises a pair of spaced parallel shafts extending beneath the base plates and transversely across the platform, a separate cam on each of said shafts, the platform being supported on said cams, means rotatably supporting said shafts, and means for releasably locking said shafts at any desired rotational position.

References Cited

UNITED STATES PATENTS

| | | | |
|---|---|---|---|
| 2,771,206 | 11/1956 | Daniels et al. | 216—9 |
| 2,860,686 | 11/1958 | Frank et al. | 140—147 |
| 2,920,661 | 1/1960 | Drukker | 140—147 |
| 3,002,539 | 10/1961 | Rus | 140—147 |

CHARLES W. LANHAM, *Primary Examiner.*

L. A. LARSON, *Assistant Examiner.*